United States Patent [19]

Scott et al.

[11] Patent Number: 5,054,333

[45] Date of Patent: Oct. 8, 1991

[54] MOVABLE PEDAL LEVER STOP

[75] Inventors: Gerald G. Scott, Troy, Mich.; Anthony R. Gurney, Toledo, Ohio

[73] Assignee: Dura Mechanical Components, Inc., Troy, Mich.

[21] Appl. No.: 527,425

[22] Filed: May 23, 1990

[51] Int. Cl.⁵ .......................................... G05G 1/14
[52] U.S. Cl. ...................................... 74/512; 74/540; 74/539; 74/535
[58] Field of Search ................ 74/512, 525, 536, 539, 74/540, 542, 526

[56] References Cited

U.S. PATENT DOCUMENTS

| | | | |
|---|---|---|---|
| 2,872,830 | 2/1959 | Hinsey | 74/540 |
| 3,602,064 | 8/1971 | Francis | 74/512 |
| 3,625,087 | 12/1971 | Flory et al. | 74/512 |
| 3,875,820 | 4/1975 | Morden | 74/512 |
| 4,364,284 | 12/1982 | Tani et al. | 74/540 |
| 4,441,380 | 4/1984 | Kawaguchi et al. | 84/539 |
| 4,612,823 | 9/1986 | De Leeuw | 74/533 |
| 4,841,798 | 6/1989 | Porter | 74/501 |

Primary Examiner—Allan D. Herrmann
Assistant Examiner—Winnie Yip
Attorney, Agent, or Firm—David A. Greenlee

[57] ABSTRACT

A cable-operated park brake actuator for a vehicle park brake is shiftable between engaged and disengaged positions; it includes an operating cable for shifting the park brake between positions, and a cable acutating pedal lever located in the vehicle operator compartment for operating the cable to shift the park brake from disengaged to engaged position upon pedal lever movement from deactuated to actuated position. The park brake actuator is provided with means for positioning the pedal lever in deactuated position, characterized by a stop member located adjacent the pedal lever for engagement thereby in deactuated position. The stop member is mounted for movement between a shipping position, enabling movement of the pedal lever from an operational condition to a non-operational condition to create slack in the cable, and an operating position for engagement by the pedal lever in deactuated position. A spring biases the stop member to its operating position. In one embodiment, the biasing spring rotates the stop member from shipping position overcenter to an unbiased neutral operating position, and subsequent engagement by the pedal lever further rotates the stop member against the spring beyond neutral position to dampen pedal lever movement.

10 Claims, 3 Drawing Sheets

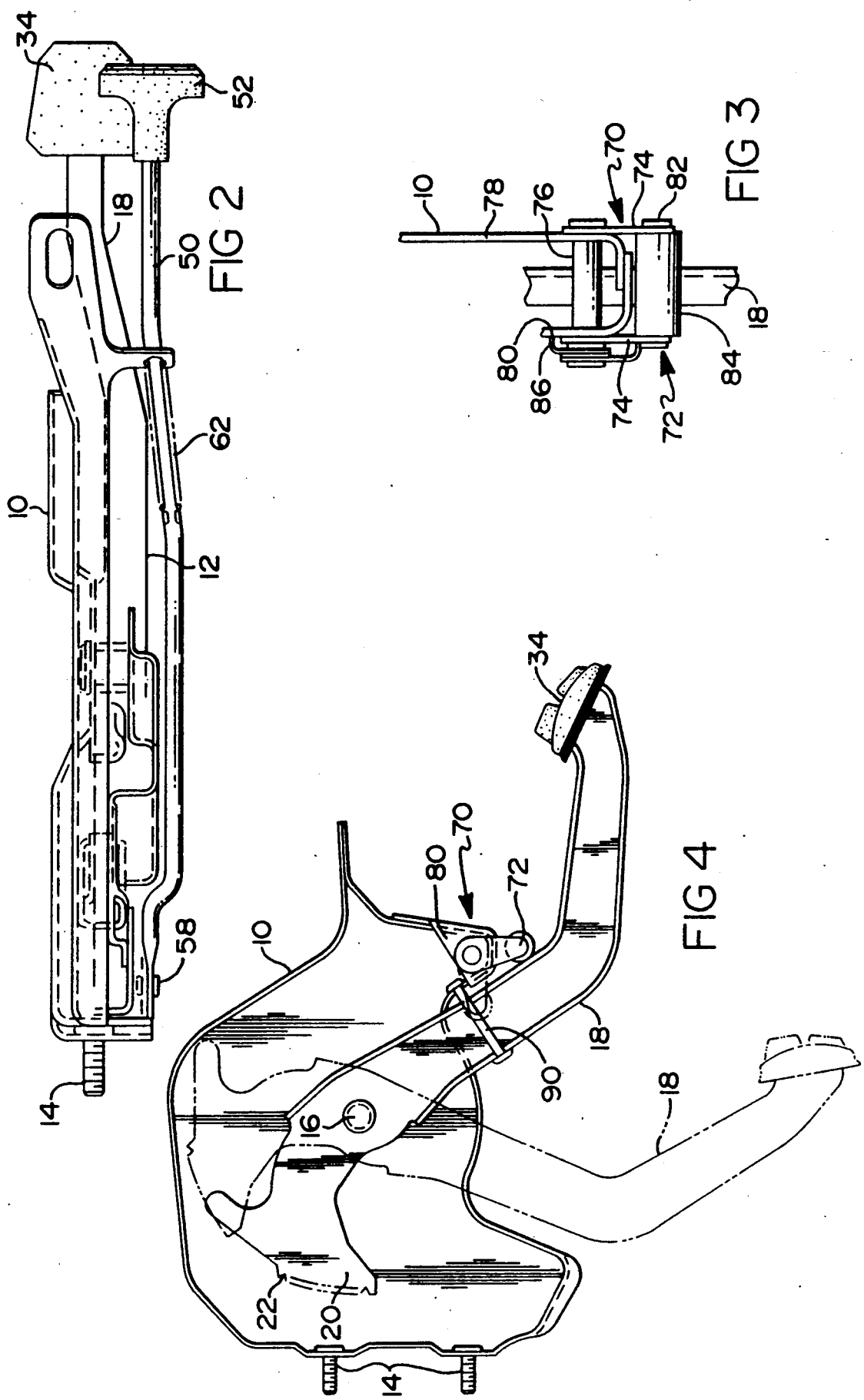

MOVABLE PEDAL LEVER STOP

FIELD OF THE INVENTION

This invention relates generally to cable-operated devices and, more particularly, a manual actuator for a cable-operated vehicle park brake.

BACKGROUND OF THE INVENTION

Many motor Vehicles are provided with a park brake that is applied and released by a manually-operated cable. The cable is normally operated by a lever in the form of a foot-actuated pedal lever or a hand-actuated lever that is moved against a return spring to set or apply the park brake. The lever is retained in its actuated position by a latch. Upon release of the latch, the return spring moves the lever to its deactuated position to release the park brake.

Movement of the lever to its deactuated position is usually limited by a rubber stop mounted on the lever or on the vehicle support structure, which somewhat cushions the force of the returning lever. Other means, such as springs, have been proposed for damping this return movement of the lever, such as shown in U.S. Pat. No. 4,841,798 to Porter et al.

Vehicles equipped with cable-operated park brakes are normally shipped from the factory with the operating cable disconnected from the park brake. Upon reaching the selling dealer, the cable is connected to make the park brake operative. It is highly desirable to have the operating lever lightly tension the operating cable in lever deactuated, or park brake off, position to consistently position the lever against the stop in all vehicles. In contrast, connection of the operating cable to the park brake is facilitated by having some slack in the cable.

It is desirable to provide slack in the cable to facilitate connection to the park brake, and yet eliminate this slack for consistent actuation of the lever to operate the park brake. It is also desirable to provide some means for damping the return force of the park brake operating lever when returning to its deactuated position.

SUMMARY OF THE INVENTION

It is therefore an object of this invention to provide means for creating cable slack to facilitate connection of the operating cable to the park brake, and to eliminate this slack after such connection is made, thus enhancing lever operation by the vehicle operator.

It is a further object of this invention to provide some means for damping the return force of the operating lever.

In accordance with this invention, a vehicle having a cable-operated park brake shiftable between engaged and disengaged positions, an operating cable for shifting the park brake between positions, and a cable actuating pedal lever located in the vehicle operator compartment for operating the cable to shift the park brake from disengaged to engaged position upon pedal lever movement from deactuated to actuated position, is provided with means for positioning the pedal lever in deactuated position. This positioning means is characterized by a stop member located adjacent the pedal lever for engagement thereby in deactuated position; means mounting the stop member for movement between a shipping position, enabling movement of the pedal lever from an operational condition to a nonoperational condition to create slack in the cable, and an operating position for engagement by the pedal lever in deactuated position; and means biasing the stop member to its operating position.

The pedal lever positioning means is further characterized by means mounting the stop member for pivotal movement, and releasable retaining means retaining the pedal lever and the stop member in shipping position. With this arrangement, upon release of the retaining means and movement of the pedal lever to actuated position, the biasing means rotates the stop member from shipping position overcenter to an unbiased neutral operating position, and subsequent engagement by the pedal lever further rotates the stop member against the biasing means beyond neutral position to dampen pedal lever movement.

This invention can also be applied to other cable-operated devices having hand or foot operating levers.

These and further features of this invention can be better understood upon reference to the following detailed description of the invention as illustrated by the accompanying drawings, in which:

DESCRIPTION OF THE DRAWINGS

FIG. 2 is a top view of the park brake actuator of FIG. 1;

FIG. 3 is a sectional view taken along lines 3—3 of FIG. 1;

FIG. 4 is a view similar to FIG. with both the actuating pedal lever and stop member shown in nonoperational condition in solid lines, and both shown in operational condition, with the pedal lever actuated, in phantom lines.

DETAILED DESCRIPTION OF THE INVENTION

Figure 1:
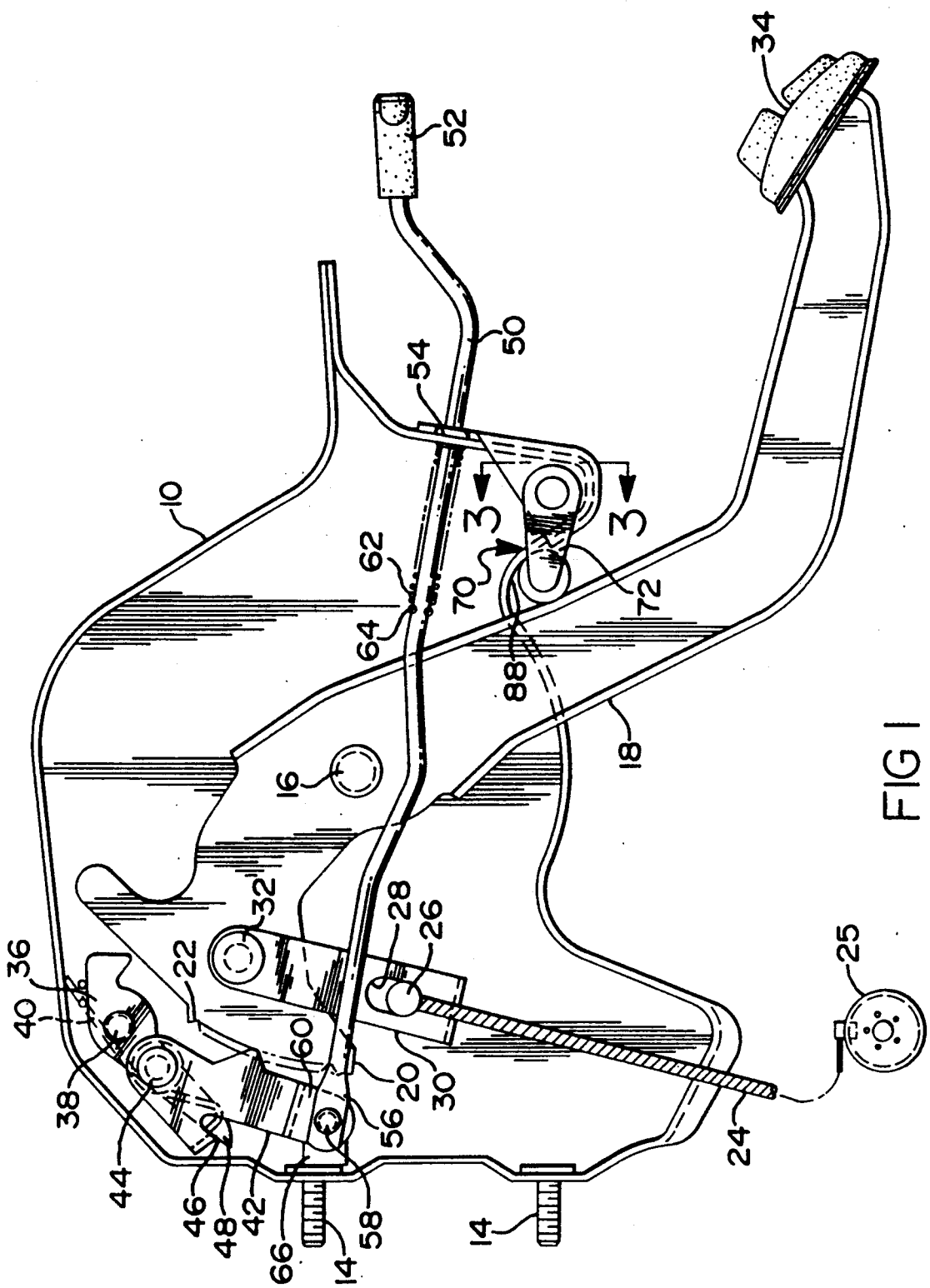
FIG. 1 is a partially broken away side view of a foot operated park brake actuator incorporating means positioning the actuating pedal lever in deactuated position according to this invention, with both the pedal lever and stop member shown in operational condition.

Referring now to FIGS. 1 and 2 of the drawings, a park brake actuator assembly is shown having a housing comprising a mounting bracket 10 and a cover plate 12. Housing 10 mounts a pair of vertically-spaced weld studs, or other fasteners, 14 for mounting the park brake actuator assembly to the firewall of an automotive vehicle beneath the left side of the dash board (not shown) in a conventional manner.

A pin 16 extends between the mounting bracket 10 and the cover plate 12 for pivotally supporting an actuating pedal lever 18. A gear sector 20, comprising a plurality of teeth 22, is formed on the inner end of pedal lever 18. A brake operating cable 24 has one end connected to a conventional vehicle park brake, shown schematically at 25. The other end 26 of cable 24 is enlarged for capture in a slot 28 of a clevis 30 that is pivoted by a pin 32 to sector 20.

The opposite end of pedal lever 18 mounts a foot pad 34 for engagement by the vehicle operator's foot. Depression of foot pad 34 rotates pedal lever 18 downwardly, or clockwise, as viewed in FIG. 1. This action rotates clevis 30 upwardly, pulling cable 24 up to apply, or set, brake 25. Pedal lever 18 is maintained in the brake apply position by a locking pawl 36, as will now be described.

Locking pawl 36 is mounted on bracket 10 by a pivot pin 38. Pawl 36 is biased in a clockwise direction, as viewed in FIG. 1, by a spring 40. A pawl release lever 42 is pivoted to cover 12 by a pivot pin 44 and includes a shoulder 46 that engages an arm 48 of pawl 36. A release rod 50 mounts a handle 52 at its outer end, extends through a bushing 54 in bracket 10, and has its inner end 56 attached by a pivot pin 58 to arm 60 of release lever 42. A compression spring 62 is trapped between an intermediate shoulder 64 of rod 50 and bracket 10 to bias the rod inwardly and release lever 42 clockwise. Release lever 42 includes a stop shoulder 66 which engages the head of the upper weld stud 14 to limit clockwise movement of release lever 42 and inward movement of rod 50.

The park brake actuator just described is similar to that shown in U.S. Pat. No. 4,612,823 to De Leeuw et al, to which reference may be had for a more complete description of construction. Operation of the park brake actuator will now be described. To apply the brake 25, pedal lever 18 is depressed, rotating sector 20 clockwise. Since the nose of pawl 36 is maintained in the path of travel of sector teeth 22 by spring 40, but is free to rotate counterclockwise, the teeth will ratchet past the pawl until pedal lever 18 is released. Then spring 40 will deposit pawl 36 between two of the teeth 22, where the brake-apply tension in cable 24 will exert a force on pawl 36 along a line below pivot pin 38. This wedges pawl 36 into locking engagement with the trailing tooth 22, thus maintaining brake 25 applied.

To release brake 25, handle 52 is pulled to extend release rod 50 against spring 62, rotating release lever 42 and shoulder 46 counterclockwise. Shoulder 46 forces pawl arm 48 counterclockwise, disengaging pawl 36 from engagement with sector teeth 22. This allows cable 24 to be pulled by brake release springs in brake 25 and rotate pedal lever 18 counterclockwise until it contacts a pedal lever positioning means, generally designated 70, according to this invention, which will now be described.

As best seen in FIG. 3, the positioning means 70 comprises a movable stop member 72 having a pair arms 74 extending from a mounting headed stud 76 that is mounted between spaced flanges 78, 80 of bracket 10. The outer ends of arms 74 are interconnected by a pin 82 that mounts a rubber roller 84. A coil spring 86 is carried by the head of stud 76 and has arms engaging bracket flange 78 and arm 74. Spring 86 biases stop member 72 counterclockwise, as viewed in FIGS. and 4, into engagement with an abutment surface 88 on bracket 10.

It is desirable to maintain a slight tension in brake cable 24 to maintain pedal lever 18 in engagement with stop roller 84 in the deactuated position of FIG. 1. However, since vehicles are normally shipped from the factory with cable 24 detached from brake 25, subsequent attachment of the cable is normally a tedious procedure, since the brake release spring force in brake 25 must be overcome. This procedure is greatly simplified by the use of positioning means 70.

To facilitate assembly of cable 24 to brake 25, cable 24 is given whatever slack is necessary, the amount varying with vehicle type. Referring now to FIGS. 1 and 4, stop member 72 is rotated counterclockwise overcenter against the force of spring 86, to the position shown in solid lines in FIG. 4. This enables pedal lever 18 to be moved upwardly a distance equal to the amount of slack desired in cable 24. Pedal lever 18 and stop member 72 are maintained in the shipping, or non-operational position, shown in FIG. 4, against the force of spring 86 by a retention clip 90.

After the vehicle has reached its destination, and cable 24 has been attached to brake 25, retention clip 90 is removed. Subsequent depression of pedal lever 18 to the phantom line position of FIG. 4 enables spring 86 to rotate stop member 72 overcenter to its illustrated operational position for subsequent engagement when the park brake is released by manipulation of handle 52. Contact of pedal lever 18 with stop roller 84 is maintained by the slight tension in operating cable 24, as previously noted.

Figure 5:
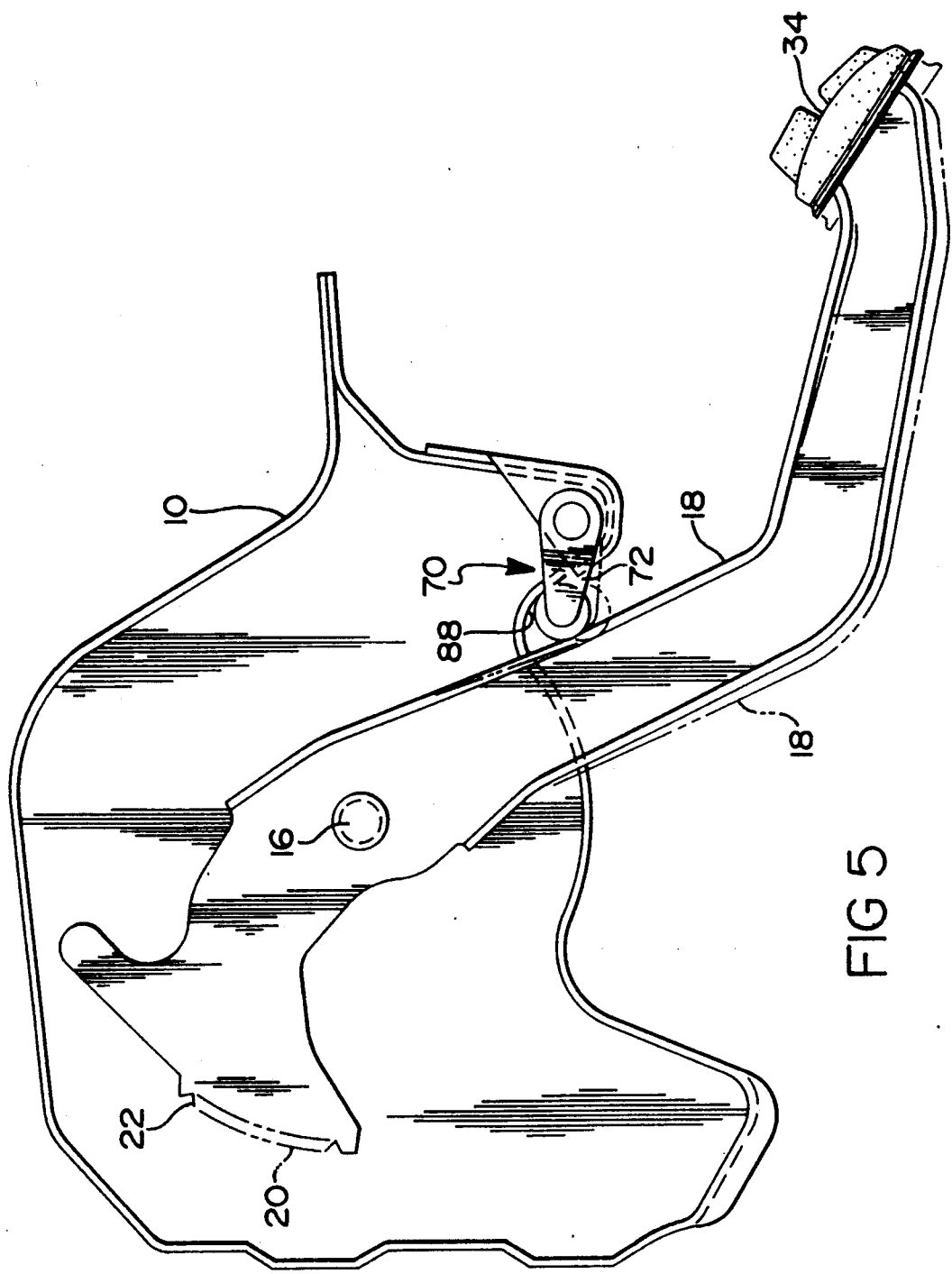
FIG. 5 is a view similar to FIG. 1, illustrating another embodiment of this invention in which the stop member functions as a pedal lever damper, with the pedal lever and stop member shown in both phantom and solid lines to illustrate the damping effect.

The impact of pedal lever 18 on stop member 72 as lever 18 returns to its deactuated position, and the attendant noise created, is objectionable. FIG. 5 illustrates a modified embodiment of this invention which provides a means for damping this impact. In this embodiment spring 86 normally positions stop member 72 in the phantom line position in which spring 86 is unstressed, and roller 84 is spaced from bracket abutment 88. Stop member 72 will occupy this position upon release from the shipping position when pedal lever 18 is initially depressed to actuated position, as previously described in reference to FIG. 4.

As pedal lever 18 is returned to its deactuated position, it engages roller 84 (phantom lines) and begins rotating stop member upwardly, since the line of force lies above the center of mounting stud 76. As stop member is moved further from its neutral position, spring 86 is increasingly stressed, damping the impact force of pedal lever 18, until roller 84 engages bracket abutment 88 (solid lines). In all other aspects, this embodiment of the invention shown in FIG. 5 functions like the FIGS. 1-4 embodiment.

As detailed above, this invention provides a park brake actuator that facilitates connection of the operating cable to the brake and, in one embodiment, provides for damping of pedal lever return force. Obvious modifications to the embodiments disclosed above and falling within the scope of the appended claims will become apparent to those skilled in the art.

We claim:

1. In a vehicle having a cable-operated device movable between extreme positions during its operation, an operating cable for shifting the device between positions, and a cable actuator for operating the cable and movable between an actuated position, a shipping position and a intermediate deactuated position, the cable actuator being operable to shift the device between extreme positions upon actuator movement from deactuated position to an actuated position, means for positioning the cable actuator in deactuated position, characterized by a stop member located adjacent the cable actuator for engagement thereby in deactuated position, means mounting the stop member for movement between an operating position for engagement by the cable actuator in deactuated position during device operation, and a shipping position, enabling movement of the cable actuator beyond deactuated position to the actuator shipping position during vehicle shipment, thus creating slack in the cable to facilitate attachment of the cable to the cable-operated device for subsequent operation thereof.

2. The cable actuator positioning means of claim 1, further characterized by means biasing the stop member to operating position.

3. The cable actuator positioning means of claim 2, further characterized by actuator retention means for retaining the cable actuator and stop member in shipping position against the force of the biasing means.

4. The cable actuator positioning means of claim 2, further characterized by the device being a park brake.

5. The cable actuator positioning means of claim 4, further characterized by the cable actuator being a foot-actuated lever.

6. The cable actuator positioning means of claim 2, further characterized by the stop member being pivotally mounted on the vehicle for movement from its shipping position to its operating position.

7. The cable actuator positioning means of claim 6, further characterized by the stop member having a range of operating positions extending from an unbiased intermediate neutral position, assumed during movement of the cable actuator to actuated position, to an extreme damping position pivotally beyond the neutral position, assumed upon movement of the cable actuator to deactuated position, thus enabling the stop means to dampen movement of the cable actuator to deactuated position.

8. The cable actuator positioning means of claim 7, further characterized by an abutment on the vehicle engageable by the stop member in its extreme position to limit movement of the pedal lever.

9. The pedal lever positioning means of claim 8, further characterized by means mounting the stop member for pivotal movement, and releasable retaining means retaining the pedal lever and the stop member in shipping position, whereby, upon release of the retaining means and movement of the pedal lever to actuated position, the biasing means rotates the stop member from shipping position overcenter to an unbiased neutral operating position, and subsequent engagement by the pedal lever further rotates the stop member against the biasing means beyond neutral position to dampen pedal lever movement.

10. In a vehicle having a cable-operated park brake movable between engaged and disengaged positions, an operating cable for shifting the park brake between positions, and a cable operating pedal lever located in the vehicle operator compartment for operating the cable and movable between an actuated position, a shipping position and an intermediate deactuated position, the pedal lever being operable to shift the park brake from disengaged to engaged position upon pedal movement from deactuated to actuated position, means for positioning the pedal lever in deactuated position, characterized by a stop member located adjacent the pedal lever for engagement thereby in deactuated position;

means mounting the stop member for movement between a shipping position, enabling movement of the pedal lever beyond deactuated position to the pedal lever shipping position to create slack in the cable, and an operating position for engagement by the pedal lever in deactuated position; and means biasing the stop member to its operating position.

* * * * *